(12) United States Patent
Strassberg et al.

(10) Patent No.: US 12,216,580 B1
(45) Date of Patent: Feb. 4, 2025

(54) PERIPHERAL DEVICE WITH CACHE UPDATING FROM MULTIPLE SOURCES

(71) Applicant: MELLANOX TECHNOLOGIES, LTD., Yokneam (IL)

(72) Inventors: Yaniv Strassberg, Yokneam (IL); Guy Harel, Haifa (IL); Gabi Liron, Yokneam Illit (IL); Yuval Itkin, Zoran (IL)

(73) Assignee: Mellanox Technologies, Ltd., Yokneam (IL)

( * ) Notice: Subject to any disclaimer, the term of this patent is extended or adjusted under 35 U.S.C. 154(b) by 0 days.

(21) Appl. No.: 18/456,536

(22) Filed: Aug. 28, 2023

(51) Int. Cl.
  *G06F 12/08* (2016.01)
  *G06F 12/0815* (2016.01)
  *G06F 12/084* (2016.01)
  *G06F 12/14* (2006.01)

(52) U.S. Cl.
  CPC ........ *G06F 12/0815* (2013.01); *G06F 12/084* (2013.01); *G06F 12/1408* (2013.01)

(58) Field of Classification Search
  None
  See application file for complete search history.

(56) References Cited

U.S. PATENT DOCUMENTS

| | | | |
|---|---|---|---|
| 10,644,885 B2 | 5/2020 | Cheng et al. | |
| 10,778,439 B2 | 9/2020 | Cheng et al. | |
| 10,824,501 B2 | 11/2020 | Itkin et al. | |
| 10,834,077 B2 | 11/2020 | Buendgen et al. | |
| 10,839,080 B2 | 11/2020 | Khessib et al. | |
| 10,984,107 B2 | 4/2021 | Itkin | |
| 11,550,715 B2 | 1/2023 | Levy et al. | |
| 2011/0191546 A1* | 8/2011 | Qureshi | G06F 12/0831 711/146 |
| 2020/0264977 A1* | 8/2020 | Iyengar | G06F 12/0826 |
| 2021/0318958 A1* | 10/2021 | Pawlowski | G06F 13/1689 |
| 2022/0245251 A1 | 8/2022 | Sfadia et al. | |

* cited by examiner

*Primary Examiner* — Kevin Verbrugge (74) *Attorney, Agent, or Firm* — Meitar Patents Ltd.; Daniel Kligler (57) ABSTRACT

A peripheral device includes a processor, a memory interface, a host interface and a cache controller. The processor executes software code. The cache memory caches a portion of the software code. The memory interface communicates with a NVM storing a replica of the software code. The host interface communicates with hosts storing additional replicas of the software code. The cache controller is to determine whether each host is allocated for code fetching, to receive a request from the processor for a segment of the software code, when available in the cache memory to fetch the segment from the cache memory, when unavailable in the cache memory and at least one host is allocated, to fetch the segment from the hosts that are allocated, when unavailable in the cache memory and no host is allocated, to fetch the segment from the NVM, and to serve the fetched segment to the processor.

24 Claims, 5 Drawing Sheets

PERIPHERAL DEVICE WITH CACHE UPDATING FROM MULTIPLE SOURCES

TECHNICAL FIELD

Embodiments described herein relate generally to updating cached software code, and particularly but not exclusively to methods and systems for secure cache updating from multiple sources.

BACKGROUND

Various secured devices are required to cryptographically authenticate and check the integrity of software code fetched into a cache memory of the device.

Methods for authenticating software code are known in the art. For example, U.S. Patent 10,824,501 describes an apparatus having a firmware memory storing firmware, a cache memory loading at least part of the firmware for execution by a processor, and a firmware checking engine having a defined syndrome storage location and performing the following iteratively on cache line entries associated with the firmware stored in the cache memory: choose a cache line entry; verify that an address mapped in the cache line entry maps to an address in the firmware memory, and when the cache line entry is locked and the address mapped in the cache line entry maps to an address in the firmware memory, compare a content of the cache line entry to a content of a corresponding address in the firmware stored in the firmware memory, and produce an integrity result indicating whether integrity of the apparatus has been compromised.

SUMMARY

An embodiment that is described herein provides a peripheral device that includes a processor, a memory interface, a host interface and a cache controller. The processor is to execute software code. The cache memory is to cache a portion of the software code. The memory interface is to communicate with a non-volatile memory (NVM) that stores a replica of the software code. The host interface is to communicate over a peripheral bus with one or more hosts that store additional respective replicas of the software code. The cache controller is to determine for each of the one or more hosts, whether the host is to be allocated or not for code fetching, based on a specified allocation criterion, to receive a request from the processor for a segment of the software code, when the segment is available in the cache memory, to fetch the segment from the cache memory, when the segment is unavailable in the cache memory and at least one of the hosts is allocated, to fetch the segment from the at least one of the hosts that are allocated via the host interface, when the segment is unavailable in the cache memory and none of the one or more hosts is allocated, to fetch the segment from the NVM via the memory interface, and to serve the fetched segment to the processor.

In some embodiments, the one or more hosts include multiple hosts, and the cache controller is to identify that two or more of the hosts are allocated for code fetching, to select a host from among the two or more of the hosts using an arbitration scheme, and to fetch the segment from the selected host. In other embodiments, the allocation criterion is based on one or more criteria belonging to a list including at least (i) operability statuses of the hosts, and (ii) workload levels of the hosts. In yet other embodiments, the cache controller is to monitor an operability status of a given host, which is not allocated for code fetching, and in response to detecting that the given host becomes operable, to allocate the given host for code fetching.

In an embodiment, the cache controller is to monitor an operability status of a given host, which is allocated for code fetching, and in response to detecting that the given host becomes inoperable, to deallocate the given host so as not to be used for code fetching. In another embodiment, the cache controller is to have access to a validated hash value precalculated by applying a hash function to the segment, and, upon fetching the segment, to verify the segment by applying the hash function to the fetched segment to produce a hash result, and to compare between the hash result and the validated hash value. In yet another embodiment, the cache controller is to receive a group of hash values and a corresponding cryptographic signature calculated over the group of hash values using a private key, to validate the group of hash values based on the received group of hash values and the cryptographic signature using a public key corresponding to the private key, and to lock the validated hash values as unmodifiable.

In some embodiments, the cache controller is to hold an authentication scheme specifying a hierarchy of multiple authentication layers, and to use a hash value in a given authentication layer to validate the hash values in another authentication layer lower in the hierarchy. In other embodiments, the segment has an accumulated size of multiple cache lines of the cache yet other memory. In embodiments, a first latency incurred in fetching the segment from the NVM is longer than a second latency incurred in fetching the segment from the one or more hosts.

In an embodiment, the cache controller is to store the replica in a given host by reading segments of the replica from the NVM, authenticating the read segments, and sending the authenticated segments for storage in the given host. In another embodiment, the cache controller is to store the replica in the given host after the peripheral device is reset, or after detecting that the given host has become operable.

There is additionally provided, in accordance with an embodiment that is described herein, a method for updating cached code, including, in a peripheral device that includes a processor executing software code, a cache memory caching a portion of the software code, and a cache controller communicating with a non-volatile memory (NVM) that stores a replica of the software code, and further communicating over a peripheral bus with one or more hosts that store additional respective replicas of the software code, determining, by the cache controller, for each of the one or more hosts, whether the host is to be allocated or not for code fetching, based on a specified allocation criterion. A request for a segment of the software code is received from the processor. When the segment is available in the cache memory, the segment is fetched from the cache memory. When the segment is unavailable in the cache memory and at least one of the hosts is allocated, the segment is fetched from the at least one of the hosts that are allocated. When the segment is unavailable in the cache memory and none of the one or more hosts is allocated, the segment is fetched from the NVM. The fetched segment is served to the processor.

These and other embodiments will be more fully understood from the following detailed description of the embodiments thereof, taken together with the drawings in which:

DETAILED DESCRIPTION OF EMBODIMENTS

Overview

Embodiments that are described herein provide improved methods and systems for efficiently and securely updating cached code from multiple sources.

In various types of electronic devices, a processor runs software code from a local memory of the device. One problem with this scheme is that in modern applications the code size is typically large and may even exceed the storage space available within the device. To accommodate storage space shortage, the whole code may be stored in a Nonvolatile Memory (NVM) external to the device and parts of the code could be fetched into a local cache memory, on demand.

Cache memory is typically handled in chunks referred to as "cache lines". Code (or data) may be fetched into the cache memory in blocks having a size of one or more cache lines. For a given application, the block size fetched is typically fixed. A disadvantage of fetching code from an external NVM is that NVMs typically have long accessing latencies, resulting in limited code updating rate and degraded runtime performance.

As will be described below, in some disclosed embodiments, replicas of the software code are stored in one or more hosts, and in an external NVM as a fallback. The replicas may contain the full software code or part of the full software code. Since fetching a code segment from a host is typically much faster than fetching the same code segment from the NVM, the cache controller may first attempt fetching a requested code segment from one of the hosts that are operable. If all the hosts are inoperable, the cache controller fetches the requested code segment from the NVM.

Some applications the electronic device is required to be secured. In accordance with one security aspect, the code fetched for caching needs to be authenticated as originating from the external NVM, and its content has not been modified. Accordingly, a code segment fetched from an external memory (e.g., host or NVM) needs to be authenticated before being authorized for execution. In the present context it is assumed that an authentication scheme validates both the authenticity and integrity of the fetched software code.

In principle, a code segment fetched from an external source could be authenticated using a cryptographic authentication scheme. Asymmetric authentication schemes, e.g., based on the Rivest-Shamir-Adleman (RSA) scheme, are highly secured cryptographically, but are typically very slow and would incur unacceptable latencies in code updating (e.g., on the order of several milliseconds per operation).

Symmetric authentication schemes such as, for example, the Advanced Encryption Standard (AES) Galois/Counter Mode (GCM), are typically considered insufficiently strong cryptographically, at least in modern applications. Other security solutions such as using an external DRAM (instead of the slow NVM) or using Physically Unclonable Functions (PUFs) are typically costly or otherwise unsuitable.

Consider a peripheral device comprising a processor, a cache memory, a memory interface, a host interface, and a cache controller. The processor executes software code. The cache memory caches a portion of the software code. The memory interface communicates with a non-volatile memory (NVM) that stores a replica of the software code. The host interface communicates over a peripheral bus with one or more hosts that store additional respective replicas of the software code. The cache controller is to: determine for each of the one or more hosts, whether the host is to be allocated or not for code fetching, based on a specified allocation criterion, to receive a request from the processor for a segment of the software code, to fetch the code segment as follows: (i) when the segment is available in the cache memory, fetch the segment from the cache memory, (ii) when the segment is unavailable in the cache memory and at least one of the hosts is allocated, fetch the segment from the at least one of the hosts that are allocated, via the host interface, and (iii) when the segment is unavailable in the cache memory and none of the one or more hosts are allocated, fetch the segment from the NVM via the memory interface, and, to serve the fetched segment to the processor.

The cache controller may use any suitable allocation criterion. In an example embodiment, the allocation criterion is based on one or more criteria belonging to a list comprising at least (i) operability statuses of the hosts, and (ii) workload levels of the hosts.

In some configurations, the peripheral device is coupled via the host interface to multiple hosts. In such configurations, when the cache controller identifies that two or more of the hosts are allocated for code fetching, the cache controller selects a host from among the two or more of the hosts using an arbitration scheme, and fetches the segment from the selected host.

The operability status of each of the hosts may change over time, which may affect host allocation for code fetching. For example, the cache controller monitors the operability status of a given host, which is not allocated for code fetching, and in response to detecting that the given host becomes operable, allocates the given host for code fetching. As another example, the cache controller monitors the operability status of a given host, which is allocated for code fetching, and in response to detecting that the given host becomes inoperable, deallocates the given host so as not to be used for code fetching.

In some embodiments, the cache controller has access to a validated hash value precalculated by applying a hash function to the segment. Upon fetching the segment, the cache controller verifies the segment by applying the hash function to the fetched segment to produce a hash result and compares between the hash result and the validated hash value.

In some embodiments, the cache controller holds a group of locked hash values that were validated as follows: the cache controller receives (e.g., from the NVM) a group of hash values and a corresponding cryptographic signature calculated over the group of hash values using a private key. The cache controller validates the group of hash values based on the received group of hash values and the cryptographic signature using a public key corresponding to the private key, and locks the validated hash values as unmodifiable.

In an embodiment, the cache controller holds an authentication scheme specifying a hierarchy of multiple authentication layers, and uses a hash value in a given authentication layer to validate the hash values in another authentication layer lower in the hierarchy.

In some embodiments, to reduce the storage space of the validated and locked hash values, the segment size is set to an accumulated size of multiple cache lines of the cache memory.

In the disclosed techniques, replicas of software code are stored in an NVM and in one or more hosts. Since the latency incurred in fetching a code segment from the NVM is longer than the latency incurred in fetching the segment from the one or more hosts, when a cache read miss event occurs, the cache controller preferably fetches the requested segment from a host rather than from the NVM. The cache controller monitors the operability status of each host and allocates or deallocates hosts for code fetching based at least on the operability statuses f the hosts. During runtime, fetched code segments are authenticated based on reference hash values that were validated using an asymmetric signature or using a higher authentication layer.

In some embodiments, the cache controller stores the replica in a given host by reading segments of the replica from the NVM, authenticating the read segments, and sending the authenticated segments for storage in the given host. The cache controller may store the replica in the given host (or in multiple hosts) after the peripheral device is reset. Alternatively or additionally, the cache controller may store the replica in a given host after detecting that the given host has become operable, This scheme may be used for updating the replica in the given host before allocating it for code fetching.

Using the disclosed embodiments, code segments are fetched with low latency and authenticated efficiently using strong cryptographic hash-based methods, therefore improving runtime performance of the software code and security level of the updated code. Moreover, the disclosed embodiments are applicable in a multi-host platform, so that arbitrating among multiple hosts allows for high availability of the hosts, and high resiliency when a host becomes inoperable or overloaded.

System Description

Figure 1:
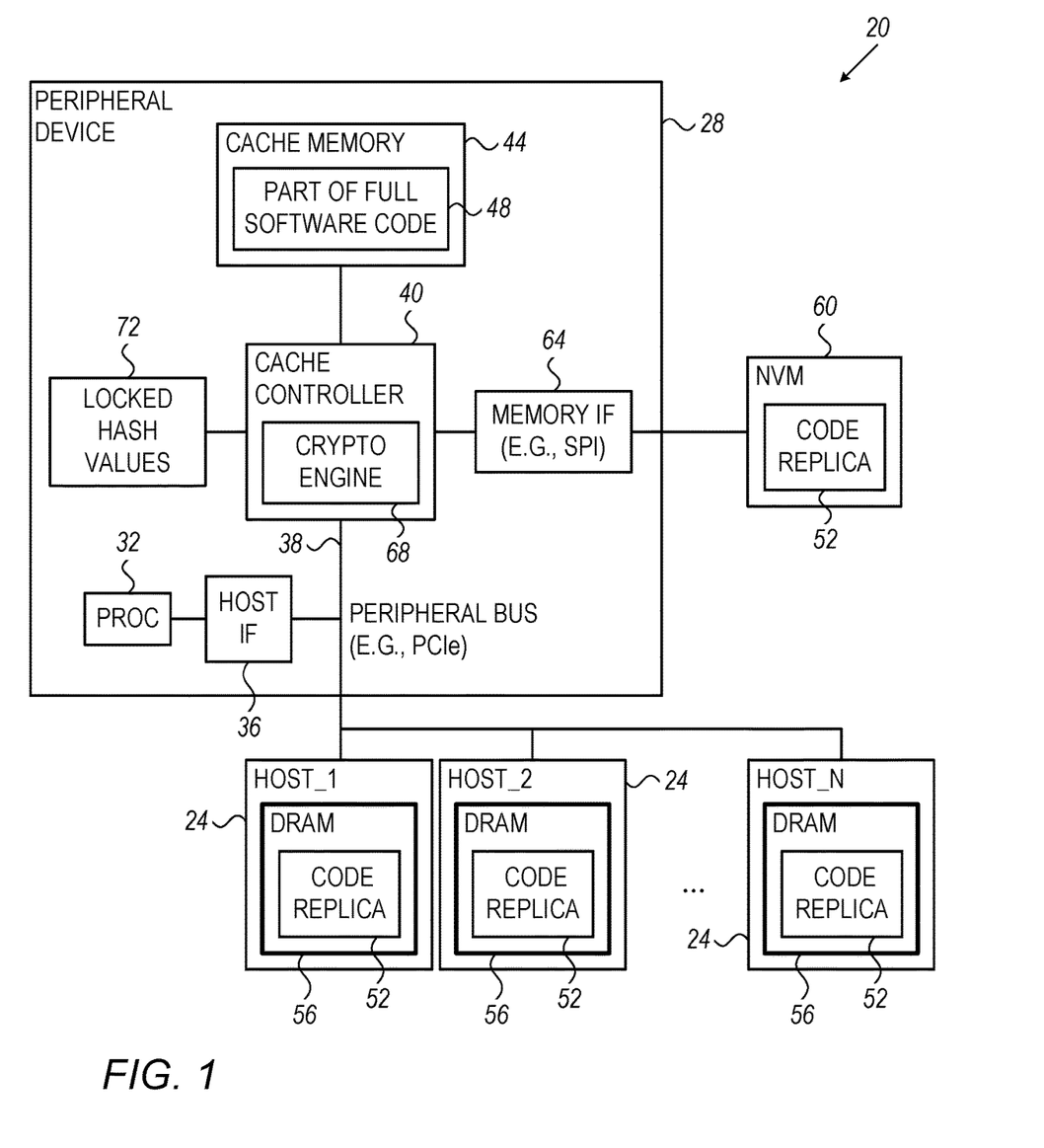
FIG. 1 is a block diagram that schematically illustrates a computer system supporting secure updating of cached code, in accordance with an embodiment that is described herein.

FIG. 1 is a block diagram that schematically illustrates a computer system 20 supporting secure updating of cached code, in accordance with an embodiment that is described herein.

Computer system 20 comprises hosts 24 served by a common peripheral device 28. In the example of FIG. 1, computer system 20 comprises multiple hosts 24 denoted HOST_1 . . . HOST N. In an alternative configuration, the computer system may comprise a single host 24. Peripheral device 28 comprises a processor 32, which communicates via a host interface 36 and over a peripheral bus 38 with hosts 24. In some embodiments the functionality of processor 32 may be implemented using two or more separate processors. Peripheral bus 38 may comprise, for example, the Peripheral Component Interconnect Express (PCIe) bus, or any other suitable type of a peripheral bus. Each of hosts 24 typically runs one or more application programs (not shown), possibly in coordination with other hosts and/or processor 32, for performing complex tasks.

Computer system 20 may be used in various applications such as, for example, in a data center or a High-Performance Computing (HPC) system, in Artificial Intelligence (AI) computing, or in a computer based appliance. Peripheral device 28 may comprise any suitable electronic device such as, for example a Network Interface Controller (NIC), a Graphic Processing Unit (GPU), and the like.

In serving hosts 24 and for other purposes, processor 32 runs software code. In the present context, the term "software code" refers to any software program (or programs) suitable to be run by the processor, e.g., a software program and/or firmware.

Peripheral device 28 comprises a cache controller 40 that manages access to a local cache memory 44. In describing computer system 20, it is assumed that the size of the underlying software code exceeds the storage space available in the cache memory, and thus the cache memory stores only part of the software code (48) at any given time.

To run a certain code segment, processor 32 requests that code segment from the cache controller. The cache controller fetches the code segment as described herein and serves the fetched code segment to the processor. When the requested code segment is available in the cache memory, the cache controller fetches the code segment from the cache memory. Otherwise, the requested code segment is currently unavailable in the cache memory, and the cache controller fetches the code segment from a memory residing externally to the peripheral device, as will be described below.

In computer system 20, replicas 52 of the full software code (or part thereof) are stored (i) in a memory 56 in each of the hosts (or at least in some of the hosts), and (ii) in an external Nonvolatile Memory (NVM) 60. Memory 56 may comprise, for example, a Dynamic Random Access Memory (DRAM). NVM 60 may comprise, for example, a Flash memory and may be accessible to the cache controller via a memory interface 64 comprising, for example, a Serial Peripheral Interface (SPI) bus or an Inter-Integrated Circuit ($I^2C$) bus. Alternatively, other suitable types of NVMs and memory interfaces can also be used.

At any given time, each of hosts 24 may be operable or inoperable. In the present context, host 24 is considered operable when the cache controller can retrieve from that host any code segment of the code replica stored in that host. A host may become "inoperable" for various reasons such as, for example, when the host enters a low power state, during host reset or boot, or when the host is too busy to handle code reads for the cache controller. In some embodiments, the cache controller monitors respective operability statuses of hosts 24, and selects one of the operable hosts from which to fetch a requested code segment.

The cache controller can fetch a requested code segment from a host or from the NVM. Since communication with the NVM is typically much slower than with a host, in some embodiments the cache controller first attempts fetching the requested code segment from one of the operable hosts, if any. When all the hosts are inoperable, the cache controller fetches the requested code segment some embodiments, the peripheral device comprises an on-chip memory (not shown), e.g., for temporarily storing data fetched from the NVM or hosts.

In some embodiments, the cache controller allocates hosts for the purpose of code fetching, e.g., based on respective operability statuses of the hosts or based on respective workload levels of the hosts. The cache controller then selects a host from which to fetch a code segment only from among the hosts currently allocated.

In some embodiments, peripheral device 28 is a secured device, which is allowed to run only code that has been authenticated successfully. To this end, cache controller 40 comprises a cryptographic engine 68 supporting various cryptographic functions and schemes. For example, cryptographic engine 68 supports an asymmetric signature scheme and a hash-based authentication scheme. In some embodiments, the cryptographic engine comprises symmetric encryption/decryption schemes, e.g., for decrypting fetched encrypted code. When verification of the signature using the public key succeeds, the cache controller stores validated hash values 72 locally and locks the validated hash values, meaning that these hash values are unmodifiable and are therefore considered securely validated within the peripheral device.

During runtime, the cache controller authenticates fetched code segments based on corresponding locked hash values 72, as will be described in detail below.

In the present context, authentication of fetched code segments is based on a cryptographic hash function that maps input data of arbitrary length into respective hash values of fixed length. The space of input values is typically larger than the space of resulting hash values. The hash function may comprise, for example, a suitable Message Authentication Code (MAC) function. The hash function may also take as input a secret key, in an embodiment, e.g., an HMAC function. A relevant key-based hash function is specified, for example, in the National Institute of Standards and Technology (NIST) standard FIPS 198-1.

The computer system and peripheral device configurations of FIG. 1 are given by way of example, and other suitable computer system and peripheral device configurations can also be used.

Some elements of peripheral device 28, e.g., elements of cache controller 40 such as crypto engine 68, may be implemented in hardware, e.g., in one or more Application-Specific Integrated Circuits (ASICs) or Field-Programmable Gate Arrays (FPGAs). Additionally or alternatively, some elements of the peripheral device can be implemented using software, or using a combination of hardware and software elements.

Elements that are not necessary for understanding the principles of the present application, such as various interfaces, addressing circuits, timing and sequencing circuits and debugging circuits, have been omitted from FIG. 1 for clarity.

In some embodiments, some of the functions of cache controller 40 may be carried out by a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

NVM 60 may comprise any suitable type of nonvolatile memory such, for example, as a Flash memory. Alternatively, other suitable types of NVMs such as a One Time Programmable (OTP) memory, e.g., a Read Only Memory (ROM) can also be used.

Memory 56 of host 64 may comprise any suitable type of a memory such as, for example, a Dynamic Random Access Memory (DRAM). Alternatively, other memory types, e.g., a Static Random Access Memory (SRAM) can also be used.

Methods for Updating Cached Code from Multiple Sources

Figure 2:
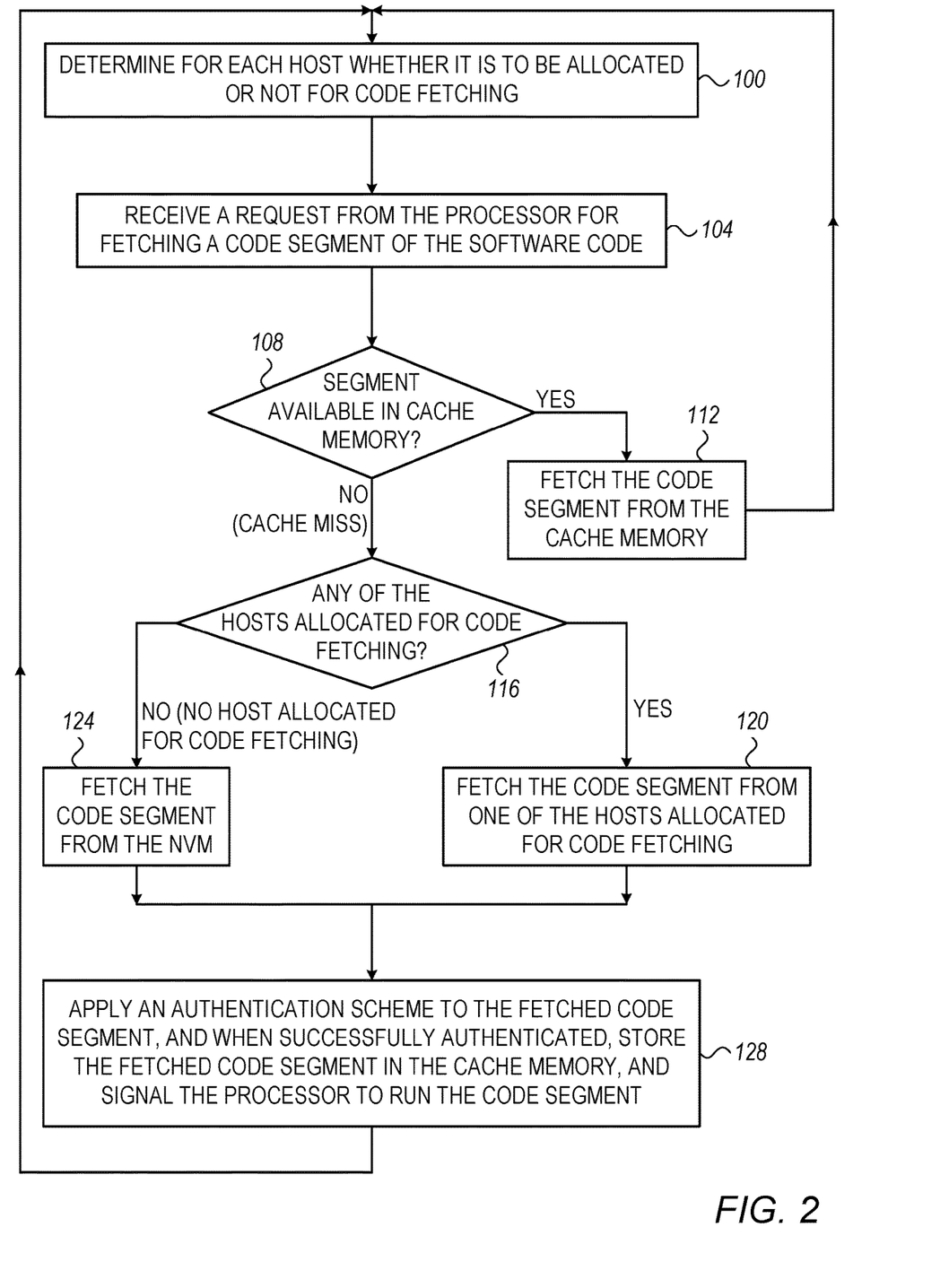
FIG. 2 is flow chart that schematically for updating cached code from illustrates a method multiple sources, in accordance with an embodiment that is described herein.

FIG. 2 is a flow chart that schematically illustrates a method for updating cached code from multiple sources, in accordance with an embodiment that is described herein.

The method will be described as executed by cache controller 40 of peripheral device 28. In describing the method of FIG. 2 it is assumed that replicas 52 of the software code have been stored in memories 56 of hosts 24 and in NVM 60.

The method begins, at a host allocation step 100, with cache controller 40 determining for each host 24 whether it is to be allocated or not for code fetching. The cache controller thus manages a pool of allocated hosts. At any given time, the pool may contain one or more hosts that are allocated for code fetching, or may be empty. The cache controller may allocate hosts for code fetching using any suitable criterion such as, for example, based on respective operability statuses of the hosts. In accordance with this criterion, a host is allocated for code fetching when the host is operable, and not allocated for code fetching when the host is inoperable. The cache controller may monitor the operability status of a host, e.g., by receiving from the host a suitable message, by querying the host, by detecting that the host is unreachable for communication, or using any other suitable method.

In some embodiments, cache controller 40 may refrain from allocating a host for code fetching even if that host is operable. For example, the cache controller may select a subset of the hosts from which to allocate hosts for code fetching, and mask out hosts not belonging to this subset regardless of their respective operability statuses. In accordance with another criterion, the cache controller allocates hosts for code fetching based on their respective workload levels. For example, the cache controller may refrain from allocating a host for code fetching when the workload level of this host exceeds a specified workload threshold.

At a request reception step 104, the cache controller receives from processor 32, a request for fetching a code segment of the software code. At a cache availability query step 108, the cache controller checks whether the requested code segment is available in local cache memory 44, and if so, fetches the requested code segment from the cache memory, at a local fetching step 112, and loops back to step 100 to update the pool of allocated hosts. Otherwise, a cache read miss event has occurred, and the missing code segment should be fetched from a memory external to the peripheral device.

At a host availability query step 116, the cache controller checks whether any of the hosts is currently allocated for code fetching, and if so, fetches the requested code segment from one of the hosts allocated for code fetching, at a fetching from a host step 120. Otherwise, none of the hosts is currently allocated for code fetching (the pool of allocated hosts is empty), and the cache controller fetches the requested code segment from NVM 60, at a fetching from NVM step 124.

At step 120 above, the cache controller may select a host from among the hosts that are currently allocated for code fetching using any suitable arbitration scheme. For example, in an embodiment, the cache controller arbitrates among the allocated hosts using a balanced arbitration scheme, meaning that hosts are selected from among the allocated hosts with equal (or close to equal) probabilities. A balanced arbitration scheme may be implemented, for example, by selecting allocated hosts sequentially and cyclically (also referred to as a round-robin arbitration method). In some embodiments, the arbitration scheme is based on host priorities. In such embodiments, the arbitration scheme selects from the pool a host having a low priority more frequently than another host in the pool having a high priority.

Following each of steps 120 and 124, the cache controller authenticates the fetched code segment, at an authentication step 128. The cache controller may apply to the fetched code segment any suitable authentication scheme. An authentication example scheme will be described with reference to FIG. 3 below. Further at step 128, when the fetched code segment is successfully authenticated, the cache controller stores the code segment in the cache memory, and signals to processor 32 that it can safely run the code segment (or part thereof, as required).

Following step 128, the method loops back to step 100 to update the pool of allocated hosts. For example, when updating the pool at step 100, the cache controller checks whether the operability status of a given host has changed and allocates or deallocates the given host, accordingly. For example, the cache controller monitors the operability status of a given host that was not allocated for code fetching, and in response to detecting that the given host becomes operable, re-allocates the given host for code fetching. In an embodiment, before re-allocating the host for code fetching, the cache controller reads an updated replica of the software code from the NVM, and sends the updated replica for storage in the host. As another example, the cache controller monitors the operability status of a given host that was allocated for code fetching, and in response to detecting that the given host becomes inoperable, deallocates the given host so as not to be used for code fetching.

The replicas stored in the hosts may be managed in various ways. In an example embodiment, upon detecting that a given host that was unavailable becomes available, the cache controller may reload the current version of the replica from the NVM into the memory of the given host, before adding the given host back into the pool of allocated for code fetching. In another the hosts embodiment, upon system startup (e.g., reset of the peripheral device), the cache controller may load the current version of the replica from the NVM to the hosts (one at a time or to multiple hosts simultaneously) before allocating these hosts for code fetching. In loading a replica from the NVM to a host, the cache controller reads segments of the replica from the NVM, authenticates the read segments, and sends the authenticated segments for storage in the host.

In some embodiments, instead of loading a code replica from the NVM to the hosts, the hosts have a local copy of the code replica which they can pre-load to their memory. In these embodiments, the cache controller may authenticate the replicas (e.g., authenticate segments of the replica) in the hosts as a pre-requisite requirement for allocating the hosts for code fetching.

The method of FIG. 2 is given by way of example, and other suitable methods can also be used. For example, when the computer system comprises a single host, the arbitration at step 120 may be omitted.

Methods for Authenticating Code Segments

Figure 3:
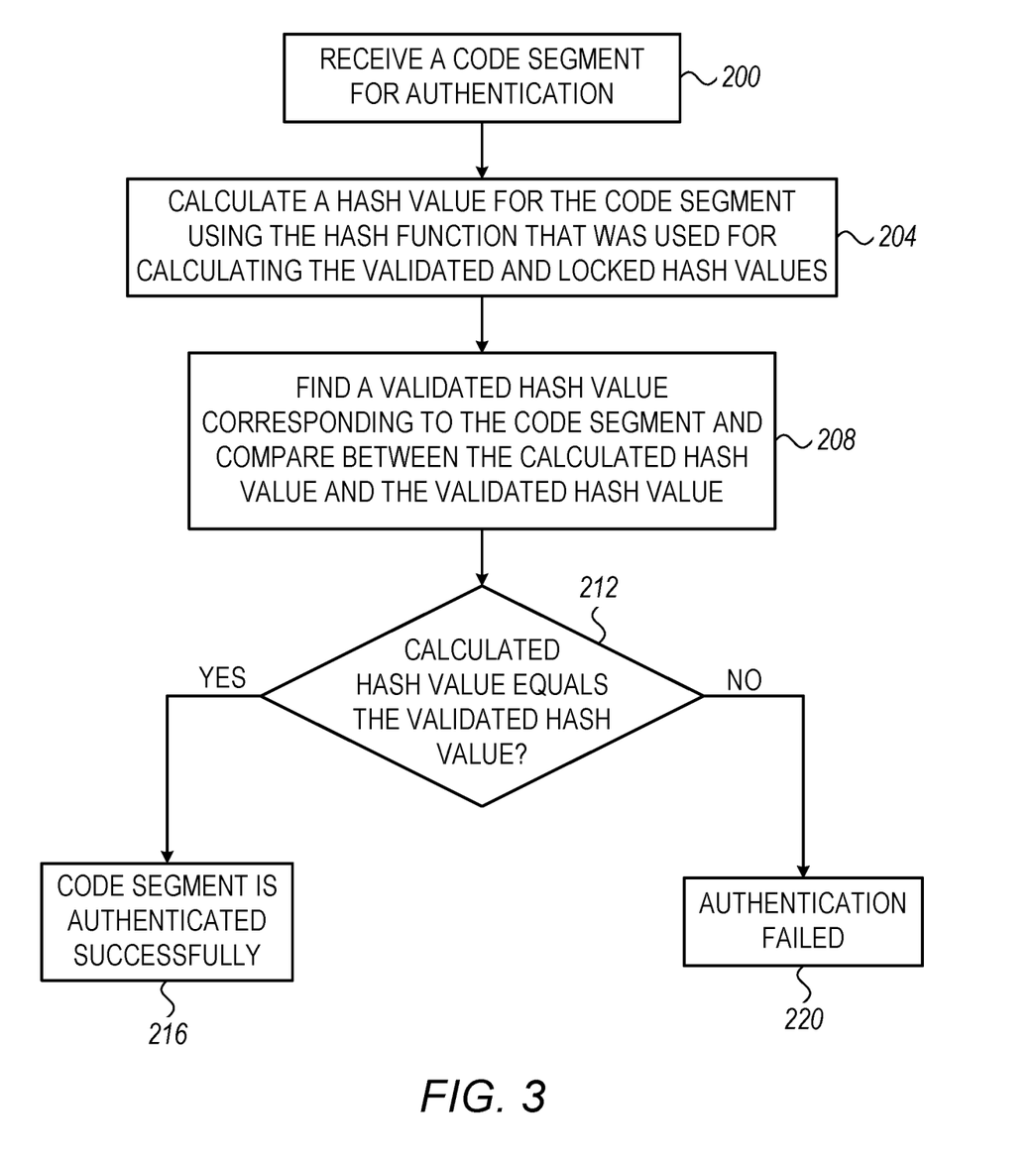
FIG. 3 is a flow chart that schematically illustrates a method for authenticating a code segment fetched from an external memory, in accordance with an embodiment that is described herein.

FIG. 3 is a flow chart that schematically illustrates a method for authenticating a code segment fetched from an external memory, in accordance with an embodiment that is described herein.

The method is applicable, for example, in implementing step 128 of the method of FIG. 2 above. The method will be described as executed by cache controller 40 of peripheral device 28. In describing the method of FIG. 3 it is assumed that a group of hash values of respective code segments have been received, validated, and locked in the peripheral device, as described above.

The method begins at a segment reception step 200, with cache controller 40 receiving a code segment for authentication. In accordance with the method of FIG. 2 above, the code segment may have been fetched from a host 24 or from NVM 60.

At a hash value calculation step 204, the cache controller calculates result hash value for the received code segment using the same hash function that was used for calculating the validated and locked hash values.

At a comparison step 208, the cache controller finds a validated hash value corresponding to the code segment and compares between the result hash value calculated at step 204 and the validated hash value. At a verification step 212, the cache controller checks whether the result hash value calculated at step 204 equals the validated hash value of step 208, and if so, reports that the code segment has been authenticated successfully, at successful authentication reporting step 216. Otherwise, the cache controller reports an authentication failure, at a failure reporting step 220.

The method of FIG. 3 is given by way of example, and other suitable methods can also be used. For example, in some embodiments, the fetched code segments are encrypted using a symmetric encryption scheme, which may be applied before or after the calculation of the hash values. In such embodiments, the cache controller decrypts the fetched code segment, before or after authentication.

Single-Layer and Multi-Layer Authentication Schemes

Figure 4A:
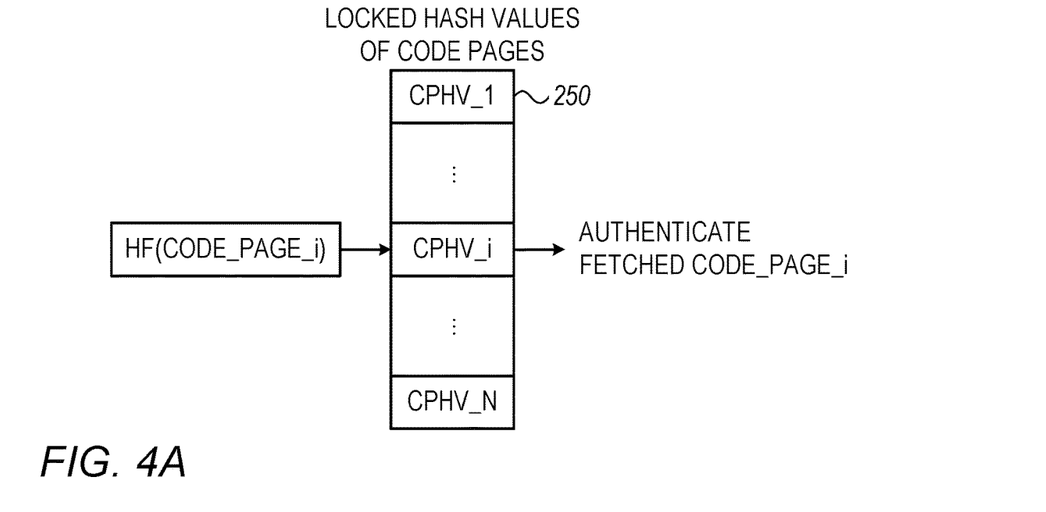
FIGS. 4A and 4B are diagrams that schematically illustrate single-layer and multi-layer authentication schemes, respectively, in accordance with an embodiment that is described herein.
Figure 4B:
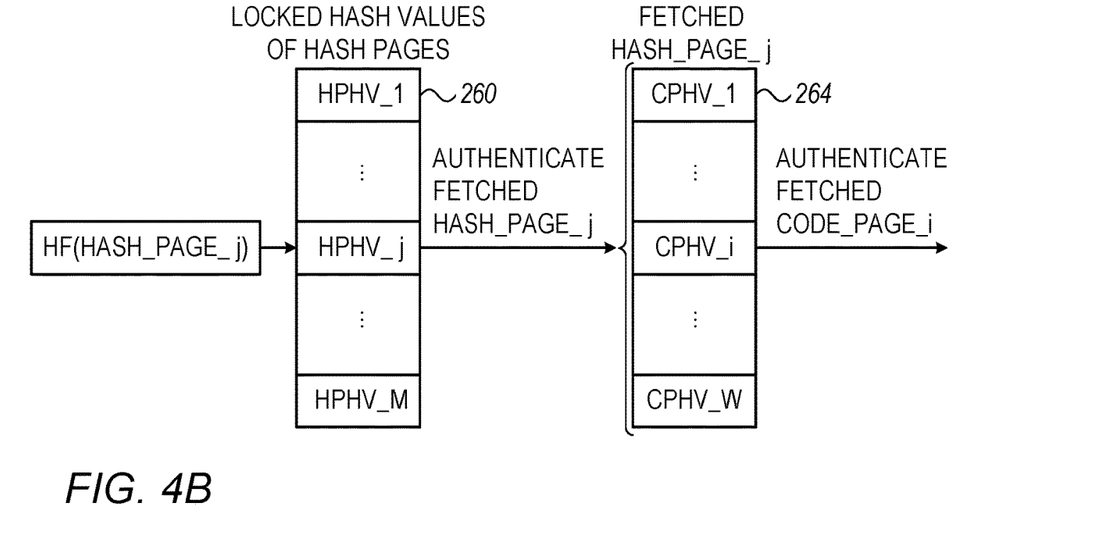

FIGS. 4A and 4B are diagrams that schematically illustrate single-layer and multi-layer authentication schemes, respectively, in accordance with an embodiment that is described herein.

In describing FIGS. 4A and 4B, it is assumed that the cache controller stores data fetched from the NVM (e.g., code segments and certain hash values) and stores them temporarily in an on-chip memory of the peripheral device.

As noted above, the cache controller stores in the peripheral device validated (and locked) hash values 72 that are used for authenticating fetched code segments. The size of the code segments fetched may be selected to determine a tradeoff between fetching latency and the number of validated and locked hash values to be stored. Moreover, the size of the hash values is required to be sufficiently large to meet specified security requirements.

A code segment having a size of one or more cache lines is also referred to herein as a "code page". In an example embodiment, the cache memory has a cache line size of 64 Bytes, the hash value size is at least 48 Bytes for sufficient cryptographic strength, e.g., 64 Bytes, and the size of the code page is 512 Bytes (eight times the cache line size). Alternatively, other suitable sizes of the cache line, hash value and code page can also be used.

FIG. 4A depicts a single-layer hash-based authentication scheme, in accordance with an embodiment that is described herein. In this scheme, the cache controller holds a group 250 of N hash values denoted CPHV_1 . . . CPHV_N corresponding to N respective code pages of the underlying software code. Group 250 may be implemented using any suitable data structure. In the present example, group 250 is implemented using a table.

In an embodiment, the cache controller populates table 250, e.g., after the peripheral device has performed a booting process, by performing: (i) loading the N hash values from NVM 60 into the peripheral device, (ii) validating the group of N hash values (e.g., using an asymmetric signature), and (iii) provisioning the N validated hash values into table 250 and locking the N hash values in table 250.

Each of the hash values in table 250 is calculated by applying a hash function denoted "HF(•)" to a corresponding code page. For example, the hash value $CPHV\_i$ of the $i^{th}$ code page (denoted CODE_PAGE_i) is calculated as given by $CPHV\_i = HF(CODE\_PAGE\_i)$. During runtime, when a code page is fetched from a host 24 or from NVM 60, the cache controller authenticates the fetched code page based on the CPHV in table 250 corresponding to the fetched code page. Let FCS denote the size of the underlying software code, and let CPS denote the size of the code pages fetched. In accordance with the scheme of FIG. 4A, the number N of hash values in table 250 is given by N=Ceiling(FCS/CPS).

In some embodiments, the number of validated and locked hash values stored (in table 250) within the peripheral device may be reduced (e.g., to meet storage space constraints) using a hierarchical authentication scheme, as described with reference to FIG. 4B below.

FIG. 4B depicts a multi-layer hash-based authentication scheme, in accordance with an embodiment that is described herein. In describing this scheme, a group of multiple hash values is referred to herein as a "hash page". In the two-level example of FIG. 4B, the hierarchy of the authentication scheme includes a "high hash page" 260 and multiple "low hash pages" 264 (the diagram depicts only one of M low hash pages, for the sake of clarity). Each low hash page contains W CPHVs of the software code, and the CPHVs in the hash page are authenticated collectively, based on a hash page hash value (denoted HPHV) calculated over the hash page. The high hash page (260) contains the M HPHVs of respective hash values denoted HPHV_1 . . . HPHV_M of M respective low hash pages. It is assumed that the HPHVs have been validated and locked as described above.

FIG. 4B depicts the $j^{th}$ low hash page containing code page hash values denoted CPHV_1 . . . CPHV_W. In an embodiment, the total number of low hash pages is given by M=Ceiling(N/W), wherein M<N.

Each HPHV in high hash page 260 was calculated by applying the hash function HF(•) to a corresponding hash page. For example, the hash value HPHV_j of the $j^{th}$ low hash page HASH_PAGE_j is calculated as given by HPHV_j=HF (HASH_PAGE_j) and stored locally.

During runtime, when a code page for which the corresponding low hash page (264) containing the CPHV of the code page is unavailable in the on-chip memory, is fetched from a host 24 or from NVM 60, the cache controller additionally fetches a low hash page (264) containing the CPHV of the code page and authenticates the fetched low hash page based on the relevant HPHV in high page 260 corresponding to the fetched code page. After the low hash page is authenticated successfully, the cache controller updates the fetched low hash page in the on-chip memory and authenticates the fetched code page, using the CPHV corresponding to that code page in the authenticated low hash page.

The authentication scheme of FIG. 4B depicts a hierarchical authentication scheme containing two authentication layers (also referred to as hashing layers), wherein the high layer contains a high hash page 260 and a low layer contains M low hash pages 264. In some embodiments, the scheme of FIG. 4B can be extended to a hierarchical authentication scheme having more than just two authentication layers. In such embodiments, the authentication scheme comprises a hierarchy of multiple authentication layers, each of which is used for authenticating a hash page of the next lower layer. The lowest layer (e.g., such as low hash page 264) is stored in the on-chip memory and is used for authenticating the fetched code page.

It is noted that in the hierarchical authentication scheme, only HPHVs of the highest layer are stored in the peripheral device and locked. The CPHVs of the lowest layer are stored in the on-chip memory and the HPHVs of the layers between the highest and lowest layers are stored externally (e.g., in NVM 60) and fetched as required.

In describing FIG. 4B it was assumed that the same hash function HF (•) is used for calculating both CPHVs and HPHVs. This, however, is not mandatory, and in alternative embodiments, a certain hash function may be used for calculating CPHVs and another different hash function may be used for calculating HPHVs. More generally, different hash functions may be used in different respective layers of the multi-layer authentication scheme.

Validation of Hash Values Using a Cryptographic Signature

Figure 5:
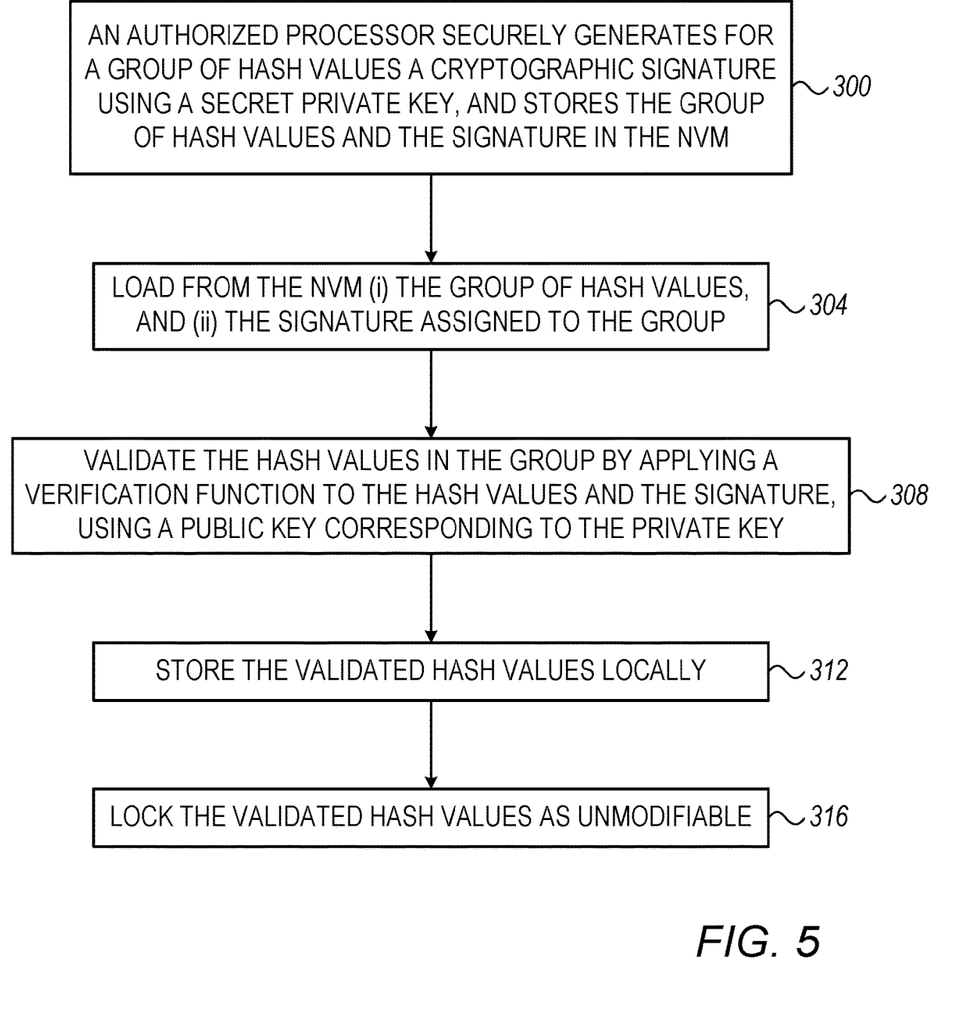
FIG. 5 flow is a chart that schematically illustrates a method for validating a group of hash values using a cryptographic signature, in accordance with an embodiment that is described herein.

FIG. 5 is a flow chart that schematically illustrates a method for validating a group of hash values using a cryptographic signature, in accordance with an embodiment that is described herein.

The method will be described as executed by an authorized processor (not shown), and cache controller 40 of peripheral device 28. It is assumed that the authorized processor runs in a highly secured environment outside computer system 20.

The method begins with the authorized processor securely generating cryptographic signature over a group of hash values, at a signature generation step 300. In an embodiment, the hash values correspond to respective code segments of the software code. In some embodiments, the authorized processor calculates the cryptographic signature by using an asymmetric signature scheme using a secret private key (having a corresponding public key), wherein the private key is unavailable outside the secured environment in which the authorized processor runs. In the present example method, the group of the hash values and the corresponding signature are stored in NVM 60. Alternatively or additionally, the hash values and signature may be stored in one or more of hosts 24.

At a provisioning step 304, cache controller 40 loads from the NVM (i) the group of the hash values, and (ii) the signature assigned to the group. At a validation step 308, the cache controller validates the hash values in the group by applying a verification function to the hash values and the signature, using the public key corresponding to the private key that was used for generating the signature. At a provisioning step 312, the cache controller stores the validated hash values locally, and at a locking step 316 locks the validated hash values stored, e.g., by controlling access permissions to the hash values (e.g., marking the hash values as unmodifiable). Following step 316 the method terminates.

The method of FIG. 5 is given by way of example, and other suitable methods can also be used. In an example embodiment, at step 300 above, the authorized processor generates the cryptographic signature by first calculating a "group hash value" over the group of hash values and then calculating the cryptographic signature over the group hash value. In this embodiment, to validate the hash values loaded, at step 308, the cache controller decodes the signature using the public key to recover the group hash value. The cache controller further calculates a check hash value over the loaded group of hash values and compares between the recovered hash value and the check hash value. The hash values in the group are successfully validated when the recovered hash value equals the check hash value.

The embodiments described above are given by way of example, and other suitable embodiments can also be used.

Although the embodiments described herein mainly address software code caching in Network Interface Controller (NIC) devices, the methods and systems described herein can also be used in other applications, such as in any add-on processors such as storage-controllers, PCIe switches, GPUs, DPUs, network switches and display controllers.

It will be appreciated that the embodiments described above are cited by way of example, and that the following claims are not limited to what has been particularly shown and described hereinabove. Rather, the scope includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A peripheral device, comprising:
a processor, to execute software code;
a cache memory, to cache a portion of the software code;
memory interface, to communicate with a non-volatile memory (NVM) that stores a replica of the software code;
a host interface, to communicate over a peripheral bus with one or more hosts that store additional respective replicas of the software code; and
a cache controller, to:
determine for each of the one or more hosts, whether the host is to be allocated or not for code fetching, based on a specified allocation criterion;
receive a request from the processor for a segment of the software code;
when the segment is available in the cache memory, fetch the segment from the cache memory;
when the segment is unavailable in the cache memory and at least one of the hosts is allocated, fetch the segment from the at least one of the hosts that are allocated, via the host interface;
when the segment is unavailable in the cache memory and none of the one or more hosts is allocated, fetch the segment from the NVM via the memory interface; and
serve the fetched segment to the processor.

2. The peripheral device according to claim 1, wherein the one or more hosts comprise multiple hosts, and wherein the cache controller is to identify that two or more of the hosts are allocated for code fetching, to select a host from among the two or more of the hosts using an arbitration scheme, and to fetch the segment from the selected host.

3. The peripheral device according to claim 1, wherein the allocation criterion is based on one or more criteria belonging to a list comprising at least (i) operability statuses of the hosts, and (ii) workload levels of the hosts.

4. The peripheral device according to claim 1, wherein the cache controller is to monitor an operability status of a given host, which is not allocated for code fetching, and in response to detecting that the given host becomes operable, to allocate the given host for code fetching.

5. The peripheral device according to claim 1, wherein the cache controller is to monitor an operability status of a given host, which is allocated for code fetching, and in response to detecting that the given host becomes inoperable, to deallocate the given host so as not to be used for code fetching.

6. The peripheral device according to claim 1, wherein the cache controller is to have access to a validated hash value precalculated by applying a hash function to the segment, and, upon fetching the segment, to verify the segment by applying the hash function to the fetched segment to produce a hash result, and to compare between the hash result and the validated hash value.

7. The peripheral device according to claim 1, wherein the cache controller is to receive a group of hash values and a corresponding cryptographic signature calculated over the group of hash values using a private key, to validate the group of hash values based on the received group of hash values and the cryptographic signature using a public key corresponding to the private key, and to lock the validated hash values as unmodifiable.

8. The peripheral device according to claim 1, wherein the cache controller is to hold an authentication scheme specifying a hierarchy of multiple authentication layers, and to use a hash value in a given authentication layer to validate the hash values in another authentication layer lower in the hierarchy.

9. The peripheral device according to claim 1, wherein the segment has an accumulated size of multiple cache lines of the cache memory.

10. The peripheral device according to claim 1, wherein a first latency incurred in fetching the segment from the NVM is longer than a second latency incurred in fetching the segment from the one or more hosts.

11. The peripheral device according to claim 1, wherein the cache controller is to store the replica in a given host by reading segments of the replica from the NVM, authenticating the read segments, and sending the authenticated segments for storage in the given host.

12. The peripheral device according to claim 11, wherein the cache controller is to store the replica in the given host after the peripheral device is reset, or after detecting that the given host has become operable.

13. A method for updating cached code, comprising:
in a peripheral device comprising a processor executing software code, a cache memory caching a portion of the software code, and a cache controller communicating with a non-volatile memory (NVM) that stores a replica of the software code, and further communicating over a peripheral bus with one or more hosts that store additional respective replicas of the software code,
determining, by the cache controller, for each of the one or more hosts, whether the host is to be allocated or not for code fetching, based on a specified allocation criterion;
receiving a request from the processor for a segment of the software code;
when the segment is available in the cache memory, fetching the segment from the cache memory;
when the segment is unavailable in the cache memory and at least one of the hosts is allocated, fetching the segment from the at least one of the hosts that are allocated;
when the segment is unavailable in the cache memory and none of the one or more hosts is allocated, fetching the segment from the NVM; and
serving the fetched segment to the processor.

14. The method according to claim 13, wherein the one or more hosts comprise multiple hosts, and comprising identifying that two or more of the hosts are allocated for code fetching, selecting a host from among the two or more of the hosts using an arbitration scheme, and fetching the segment from the selected host.

15. The method according to claim 13, wherein the allocation criterion is based on one or more criteria belonging to a list comprising at least (i) operability statuses of the hosts, and (ii) workload levels of the hosts.

16. The method according to claim 13, and comprising, monitoring an operability status of a given host, which is not allocated for code fetching, and in response to detecting that the given host becomes operable, allocating the given host for code fetching.

17. The method according to claim 13, and comprising, monitoring the operability status of a given host, which is allocated for code fetching, and in response to detecting that the given host becomes inoperable, deallocating the given host so as not to be used for code fetching.

18. The method according to claim 13, wherein the cache controller having access to a validated hash value precalculated by applying a hash function to the segment, and comprising, upon fetching the segment, verifying the segment by applying the hash function to the fetched segment to produce a hash result, and comparing between the hash result and the validated hash value.

19. The method according to claim 13, and comprising, receiving a group of hash values and a corresponding cryptographic signature calculated over the group of hash values using a private key, validating the group of hash values based on the received group of hash values and the cryptographic signature using a public key corresponding to the private key, and locking the validated hash values as unmodifiable.

20. The method according to claim 13, and comprising, holding an authentication scheme specifying a hierarchy of multiple authentication layers, and using a hash value in a given authentication layer to validate the hash values in another authentication layer lower in the hierarchy.

21. The method according to claim 13, wherein the segment has an accumulated size of multiple cache lines of the cache memory.

22. The method according to claim 13, wherein a first latency incurred in fetching the segment from the NVM is longer than a second latency incurred in fetching the segment from the one or more hosts.

23. The method according to claim 13, and comprising storing the replica in a given host by reading segments of the replica from the NVM, authenticating the read segments, and sending the authenticated segments for storage in the given host.

24. The method according to claim 23, wherein storing the replica in the given host comprises storing the replica in the given host after the peripheral device is reset, or after detecting that the given host has become operable.

* * * * *